(12) United States Patent
Bontu et al.

(10) Patent No.: US 11,743,843 B2
(45) Date of Patent: Aug. 29, 2023

(54) METHODS FOR MODIFICATION OF AT LEAST ONE MEASUREMENT REPORTING TRIGGER FOR BIASED MEASUREMENTS AT THE WIRELESS DEVICE

(71) Applicant: Telefonaktiebolaget LM Ericsson (publ), Stockholm (SE)

(72) Inventors: Chandra Bontu, Nepean (CA); Mercy George, Kanata (CA); Iris Bujold, Ottawa (CA); Edward Mah, Kanata (CA); Alireza Mirzaee, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/640,897

(22) PCT Filed: Sep. 18, 2019

(86) PCT No.: PCT/IB2019/057880
§ 371 (c)(1),
(2) Date: Mar. 7, 2022

(87) PCT Pub. No.: WO2021/053371
PCT Pub. Date: Mar. 25, 2021

(65) Prior Publication Data
US 2022/0346039 A1    Oct. 27, 2022

(51) Int. Cl.
*H04W 52/42* (2009.01)
*H04B 17/318* (2015.01)
*H04W 52/24* (2009.01)

(52) U.S. Cl.
CPC .......... *H04W 52/42* (2013.01); *H04B 17/318* (2015.01); *H04W 52/245* (2013.01); *H04W 52/246* (2013.01)

(58) Field of Classification Search
CPC . H04W 52/42; H04W 52/245; H04W 52/246; H04B 17/318
See application file for complete search history.

(56) References Cited

U.S. PATENT DOCUMENTS 8,913,997 B2 * 12/2014 Singh ................. H04L 65/1083
455/414.1
9,661,517 B2 *  5/2017 Stott .................... H04B 7/0452
(Continued)

FOREIGN PATENT DOCUMENTS

EP          2882110 A1    10/2015
EP          3379747 A1     9/2018
WO   WO-2020234507 A1 *  11/2020  ............ H04W 24/02

OTHER PUBLICATIONS

International Search Report and Written Opinion dated May 18, 2020 issued in PCT Application No. PCT/IB2019/057880, consisting of 12 pages.

(Continued)

*Primary Examiner* — Hai V Nguyen
(74) *Attorney, Agent, or Firm* — Christopher & Weisberg, P.A.

(57) ABSTRACT

A method, network node, wireless device and system are provided. In one or more embodiments, the network node is configured to communicate with a wireless device. The network node includes processing circuitry configured to: determine to transition the wireless device to one of a beamforming mode and non-beam forming mode, in response to the determination to transition the wireless device, modify at least one measurement report trigger associated with the wireless device, and transmit an indication of the modification of the at least one measurement report trigger to the wireless device.

24 Claims, 13 Drawing Sheets

(56) References Cited

U.S. PATENT DOCUMENTS

| | | | | |
|---|---|---|---|---|
| 10,431,888 | B2* | 10/2019 | Seol | H04B 7/0408 |
| 10,470,128 | B2* | 11/2019 | Noh | H04W 52/0229 |
| 10,749,586 | B2* | 8/2020 | Mizusawa | H04B 7/0626 |
| 10,798,623 | B2* | 10/2020 | Pu | H04W 36/0094 |
| 10,985,828 | B2* | 4/2021 | Islam | H04W 40/248 |
| 2016/0006122 | A1* | 1/2016 | Seol | H01Q 3/30 |
| | | | | 342/372 |
| 2016/0373196 | A1* | 12/2016 | Stott | H04W 24/06 |
| 2016/0381610 | A1* | 12/2016 | Pu | H04W 36/0058 |
| | | | | 455/436 |
| 2017/0142659 | A1* | 5/2017 | Noh | H04W 52/0229 |
| 2018/0323848 | A1* | 11/2018 | Mizusawa | H04B 7/04 |
| 2020/0213952 | A1* | 7/2020 | Wang | H04B 1/3838 |
| 2020/0322893 | A1* | 10/2020 | Yao | H04L 25/0226 |
| 2020/0413267 | A1* | 12/2020 | Xue | H04W 24/02 |
| 2021/0242935 | A1* | 8/2021 | Sakhnini | H04B 7/0617 |
| 2022/0124469 | A1* | 4/2022 | Liao | H04L 67/34 |
| 2022/0146620 | A1* | 5/2022 | Alawieh | H04L 5/0051 |
| 2022/0217781 | A1* | 7/2022 | Decarreau | G06N 3/08 |

OTHER PUBLICATIONS

3GPP TS 36.211 V13.11.0 (Jun. 2019) 3rd Generation Partnership Project; Technical Specification Group Radio Access Network; Evolved Universal Terrestrial Radio Access (E-UTRA); Physical Channels and Modulation (Release 13), consisting of 173 pages.

3GPP TS 36.213 V12.4.0 (Dec. 2014) 3rd Generation Partnership Project; Technical Specification Group Radio Access Network; Evolved Universal Terrestrial Radio Access (E-UTRA); Physical Layer Procedures (Release 12), consisting of 225 pages.

3GPP TS 36.214 V12.2.0 (Mar. 2015) 3rd Generation Partnership Project; Technical Specification Group Radio Access Network; Evolved Universal Terrestrial Radio Access (E-UTRA); Physical Layer; Measurements (Release 12), consisting of 17 pages.

3GPP TS 36.331 V13.1.0 (Mar. 2016) 3rd Generation Partnership Project; Technical Specification Group Radio Access Network; Evolved Universal Terrestrial Radio Access (E-UTRA); Radio Resource Control (RRC); Protocol Specification (Release 13), consisting of 551 pages.

\* cited by examiner

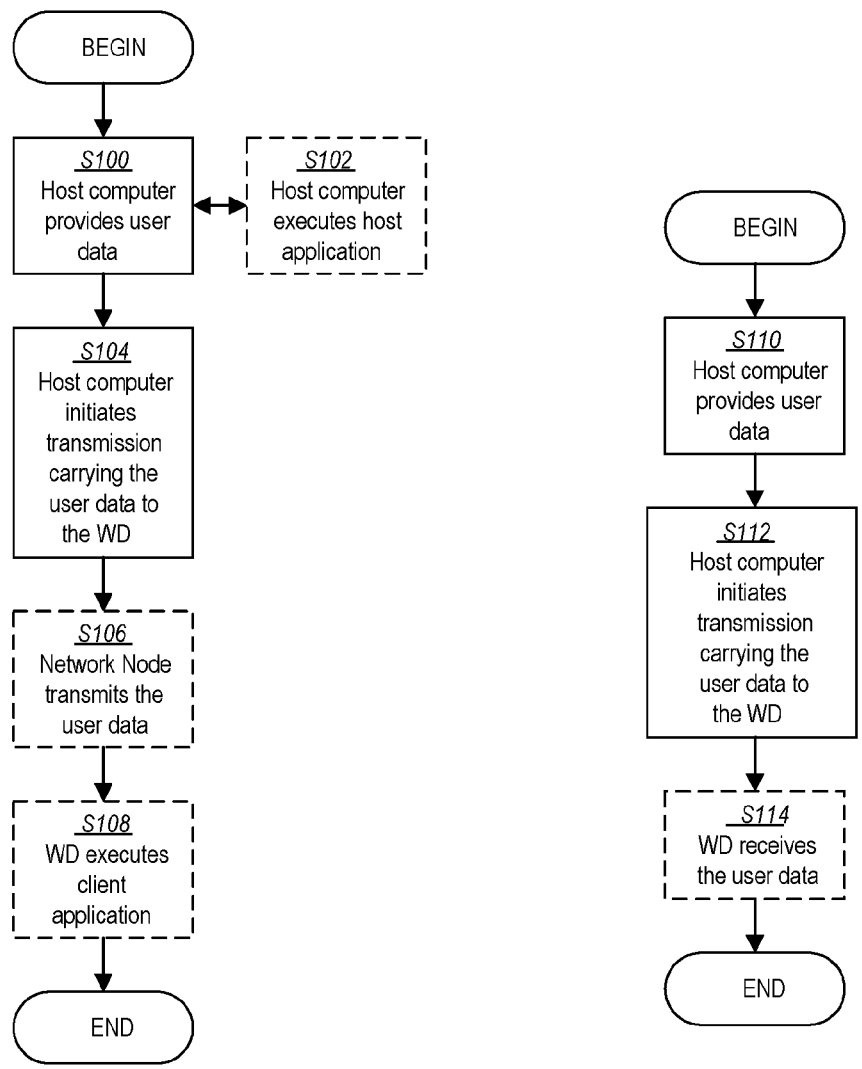

METHODS FOR MODIFICATION OF AT LEAST ONE MEASUREMENT REPORTING TRIGGER FOR BIASED MEASUREMENTS AT THE WIRELESS DEVICE

CROSS-REFERENCE TO RELATED APPLICATIONS

This application is a Submission Under 35 U.S.C. § 371 for U.S. National Stage Patent Application of International Application Number: PCT/IB2019/057880, filed Sep. 18, 2019 entitled "METHODS FOR MODIFICATION OF AT LEAST ONE MEASUREMENT REPORTING TRIGGER FOR BIASED MEASUREMENTS AT THE WIRELESS DEVICE," the entirety of which is incorporated herein by reference.

TECHNICAL FIELD

The present disclosure relates to wireless communications, and in particular, to modifying a trigger for measurement and/or measurement reporting at/by a wireless device.

BACKGROUND

In third generation partnership project (3GPP) New Radio (NR, also referred to as $5^{th}$ Generation (5G)) and Long Term Evolution (LTE, also referred to as 4G), measurements such as Reference Signal Received Quality (RSRQ) and Reference Signal Receive Power (RSRP) measured by the wireless device may be used in one or more of cell selection, cell reselection and handover to an appropriate cell. One or more of these measurements may be performed on one or more of cell-specific reference signals (CRS), Channel State Information-Reference Signal (CSI-RS) and signals on the Physical Downlink Shared Channel (PDSCH).

RSRP and RSRQ as Discussed in 3GPP such as in 3GPP Technical Specification (TS) 36.214 Version 12.0.0:

Reference signal received power (RSRP), may be defined as the linear average over the power contributions of the resource elements that carry cell-specific reference signals (CSI-RS) within the considered measurement frequency bandwidth.

For RSRP determination, the cell-specific reference signals (CSI-RS) $R_0$ according to 3GPP such as 3GPP TS 36.211 may be used. If the wireless device can reliably detect that $R_1$ is available, the wireless device may use $R_1$ in addition to $R_0$ to determine RSRP.

The reference point for the RSRP may be the antenna connector of the wireless device.

Reference Signal Received Quality (RSRQ) may be defined as the ratio N×RSRP/(E-UTRA carrier Received Signal Strength Indicator (RSSI)), where N is the number of Resource Blocks (RBs) of the E-UTRA carrier RSSI measurement bandwidth. The measurements in the numerator and denominator may be made over the same set of RBs.

E-UTRA Carrier RSSI may include the linear average of the total received power observed, for example, only in Orthogonal Frequency-Division Multiplexing (OFDM) symbols containing reference symbols for antenna port 0, in the measurement bandwidth, over N number of RBs by the wireless device from all sources, including co-channel serving and non-serving cells, adjacent channel interference, thermal noise, etc. If higher-layer (i.e., Open System Interconnection (OSI) layer) signalling indicates certain subframes for performing RSRQ measurements, then RSSI is measured over all OFDM symbols in the indicated subframes.

The reference point for the RSRQ may be the antenna connector of the wireless device.

If receiver diversity is in use by the wireless device, the reported value may not be lower than the corresponding RSRP of any of the individual diversity branches.

FIG. 1 is a diagram of a wireless device measurement procedure in system 2 that may use LTE and NR. System 2 includes network node 4 that provides one or more cells (collectively referred to as cell-i) and is in communication with wireless device 6 via one or more wireless communication protocols such as LTE and/or NR based protocols. Network node 4 includes one or more antennas 8 for receiving and/or transmitting signals such as via an air interface. For example, network node 4 may transmit, via antennas 8, reference signals $R_o{}^i$ and $R_1{}^i$ from antenna port 0 and 1. Wireless device 6 includes one or more antennas 9 for receiving and/or transmitting signals such as via an air interface. For example, wireless device 6 may receive references signals $R_o{}^i$ and $R_1{}^i$ via antennas 9.

In particular, wireless device 6 may detect (Block S10) reference signal $R_o{}^i$ via a first detector, wireless device 6 may optionally detect one or more of reference signals $R_o{}^i$ and $R_1{}^i$ via one or more detectors. Wireless device 6 may perform (Block S20) weighted combining or selection for outputting reference signal power and received power. Wireless device 6 may perform (Block S30) time filtering on the received power. Wireless device 6 may compute (Block S40) a reference signal received quality (RSRQ) based on the output of the time filtering.

In particular, the reported measurement value may depend to some extent on the wireless device's proprietary settings of the measurement procedure. For example, the wireless device 6 may perform the measurements from the signal received by all the receive antennas or just one receive antenna depending, for example, on the wireless device's configuration. Further, in some cases, the wireless device 6 may also choose to perform the measurements over multiple reference signals.

RSRP measurement may be affected by these variations in wireless device 6 measurement procedures/configurations. However, RSRQ, which is a ratio of RSRP and RSSI may not be affected based on the varying wireless device measurement procedures since both the numerator and denominator of RSRQ are equally affected, hence the effect of the varying procedures may be cancelled out.

Further, RSRQ may be affected by the wireless device specific beamforming and/or downlink (DL) power control. The transmissions on the DL can be precoded and power adjusted per wireless device-specific physical channels as illustrated in equation (1) below.

$$RSRQ = \frac{avRsPwr}{(avRsPwrPerPrbS + avPdschPwrPerPrbS) + interCellInterfPwrPerPrb} \quad (1)$$

where avRsPwr is the average reference signal power of the serving cell per resource element. interCellInterfPwrPerPrb is the average power per PRB received from all the neighboring co-channel cells. avRsPwrPerPrbS is the average RS power per PRB received from the serving cell (avRsPwrPerPrbS=12*avRsPwr). avPdschPwrPerPrbS term is the power received over the resource elements that are used to send PDSCH to a wireless device 6 from the wireless device's serving cell(s). When the transmission towards each wireless device 6 is changed, either by increasing the transmit power or precoding the transmission, to meet the wireless device's traffic quality requirements, for example, the RSRQ measure at the wireless device 6 may be considered biased, as described below.

One digital beamforming example is described. In digital beamforming, PDSCH transmission towards a wireless device 6 is precoded such that the wireless device 6 detects increased power levels of the desired signal, e.g., avPdschPwrPerPrbS, when the signal passes through the wireless channel. Another wireless device 6 which receives the same signal may not detect this gain in the signal, since one or more of the signal passes through different communication links and since the transmissions are precoded for the communication link between the serving cell and the intended wireless device such that the measured signals at the intended wireless device are biased for the intended wireless device.

From equation (1), above, it can be seen that the value of RSRQ reduces when avPdschPwrPerPrbS increases, for example, due to beamforming gain. FIG. 2 is a diagram of the effect of beamforming on RSRQ where this trend of a reduction in RSRQ with beamforming enabled is illustrated.

Therefore, existing systems suffer from one or more issues with respect to wireless device measurement procedures.

SUMMARY

Some embodiments advantageously provide methods, systems, network nodes and wireless devices for modifying a trigger for measurement and/or measurement reporting.

According to one or more embodiments, the wireless device measurement procedures affected by power control and/or beamforming on DL transmissions may be corrected and/or modified by at least in part:
estimating, by the network node, the increase in RSSI at the wireless device;
computing the change in RSRQ trigger; and
informing the computed change in the RSRQ trigger to the wireless device.

According to one or more embodiments, the wireless device measurement procedures affected by power control and/or beamforming on DL transmissions are corrected and/or modified by at least in part:
estimating, by the network node, the increase in RSSI at the wireless device;
computing the change in RSRQ trigger; and
applying the change in event decision making, such as hand-over.

According to one aspect of the disclosure, a network node configured to communicate with a wireless device is provided. The network node includes processing circuitry configured to: determine to transition the wireless device to one of a beamforming mode and non-beam forming mode, in response to the determination to transition the wireless device, modify at least one measurement report trigger associated with the wireless device, and transmit an indication of the modification of the at least one measurement report trigger to the wireless device.

According to one or more embodiments of this aspect, the processing circuitry is further configured to estimate a change in a received signal strength indicator, RSSI, at the wireless device where the modification of the at least one measurement report trigger being based at least in part on the estimated change in the RSSI at the wireless device. According to one or more embodiments of this aspect, the wireless device is transitioned from a non-beamforming mode to a beamforming mode. The processing circuitry is further configured to determine a power gain associated with the beamforming mode where the modification of the at least one measurement report trigger is based at least in part on the determined power gain associated with the beamforming mode. According to one or more embodiments of this aspect, the determined power gain is based at least in part on at least one of: a physical downlink shared channel, PDSCH, allocation size to the wireless device, a beamforming gain per at least one physical resource block, PRB, and a PDSCH transmission power with respect to a reference signal transmission power.

According to one or more embodiments of this aspect, the determined power gain is based at least in part on a weighted sum of a ratio of a PDSCH transmission power and a reference signal transmission power per physical resource block. According to one or more embodiments of this aspect, the determined power gain is based at least in part on the PDSCH power control being enabled. According to one or more embodiments of this aspect, the determined power gain is based at least in part on a ratio of the PDSCH transmission power relative to a reference signal transmission power. According to one or more embodiments of this aspect, the determined gain is based at least in part on the PDSCH transmission power control being disabled.

According to one or more embodiments of this aspect, the processing circuitry is further configured to perform time filtering across a plurality of subframes associated with the ratio of the PDSCH transmission power and reference signal transmission power per physical resource block to determine an expected power gain. The determined power gain associated with the beamforming mode corresponds to the expected power gain. According to one or more embodiments of this aspect, the PDSCH transmission power corresponds to a PDSCH energy per resource element, EPRE, value and the reference signal transmission power is a cell specific reference signal, CRS, EPRE value. According to one or more embodiments of this aspect, the indication of the modification of the at least one measurement report trigger is provided by radio resource control signaling, RRC. According to one or more embodiments of this aspect, the at least one measurement report trigger corresponds to a reference signal received quality, RSRQ, measurement report trigger.

According to another aspect of the disclosure, a method implemented by a network node that is configured to communicate with a wireless device is provided. A determination is made to transition the wireless device to one of a beamforming mode and non-beam forming mode. In response to the determination to transition the wireless device, at least one measurement report trigger associated with the wireless device is modified. An indication of the modification of the at least one measurement report trigger is transmitted to the wireless device.

According to one or more embodiments of this aspect, a change in a received signal strength indicator, RSSI, at the wireless device, is estimated where the modification of the at least one measurement report trigger being based at least in part on the estimated change in the RSSI at the wireless device. According to one or more embodiments of this aspect, the wireless device is transitioned from a non-beamforming mode to a beamforming mode where a power gain associated with the beamforming mode is determined. The modification of the at least one measurement report trigger is based at least in part on the determined power gain associated with the beamforming mode. According to one or more embodiments of this aspect, the determined power gain is based at least in part on at least one of: a physical downlink shared channel, PDSCH, allocation size to the wireless device, a beamforming gain per at least one physical resource block, PRB, and a PDSCH transmission power with respect to a reference signal transmission power.

According to one or more embodiments of this aspect, the determined power gain is based at least in part on a weighted sum of a ratio of a PDSCH transmission power and a reference signal transmission power per physical resource block. According to one or more embodiments of this aspect, the determined power gain is based at least in part on the PDSCH power control being enabled. According to one or more embodiments of this aspect, the determined power gain is based at least in part on a ratio of the PDSCH transmission power relative to a reference signal transmission power. According to one or more embodiments of this aspect, the determined gain is based at least in part on the PDSCH transmission power control being disabled.

According to one or more embodiments of this aspect, time filtering across a plurality of subframes associated with the ratio of the PDSCH transmission power and reference signal transmission power per physical resource block is performed to determine an expected power gain where the determined power gain associated with the beamforming mode corresponding to the expected power gain. According to one or more embodiments of this aspect, the PDSCH transmission power corresponds to a PDSCH energy per resource element, EPRE, value and the reference signal transmission power is a cell specific reference signal, CRS, EPRE value. According to one or more embodiments of this aspect, the indication of the modification of the at least one measurement report trigger is provided by radio resource control signaling, RRC. According to one or more embodiments of this aspect, the at least one measurement report trigger corresponds to a reference signal received quality, RSRQ, measurement report trigger.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

DETAILED DESCRIPTION

Figure 1:
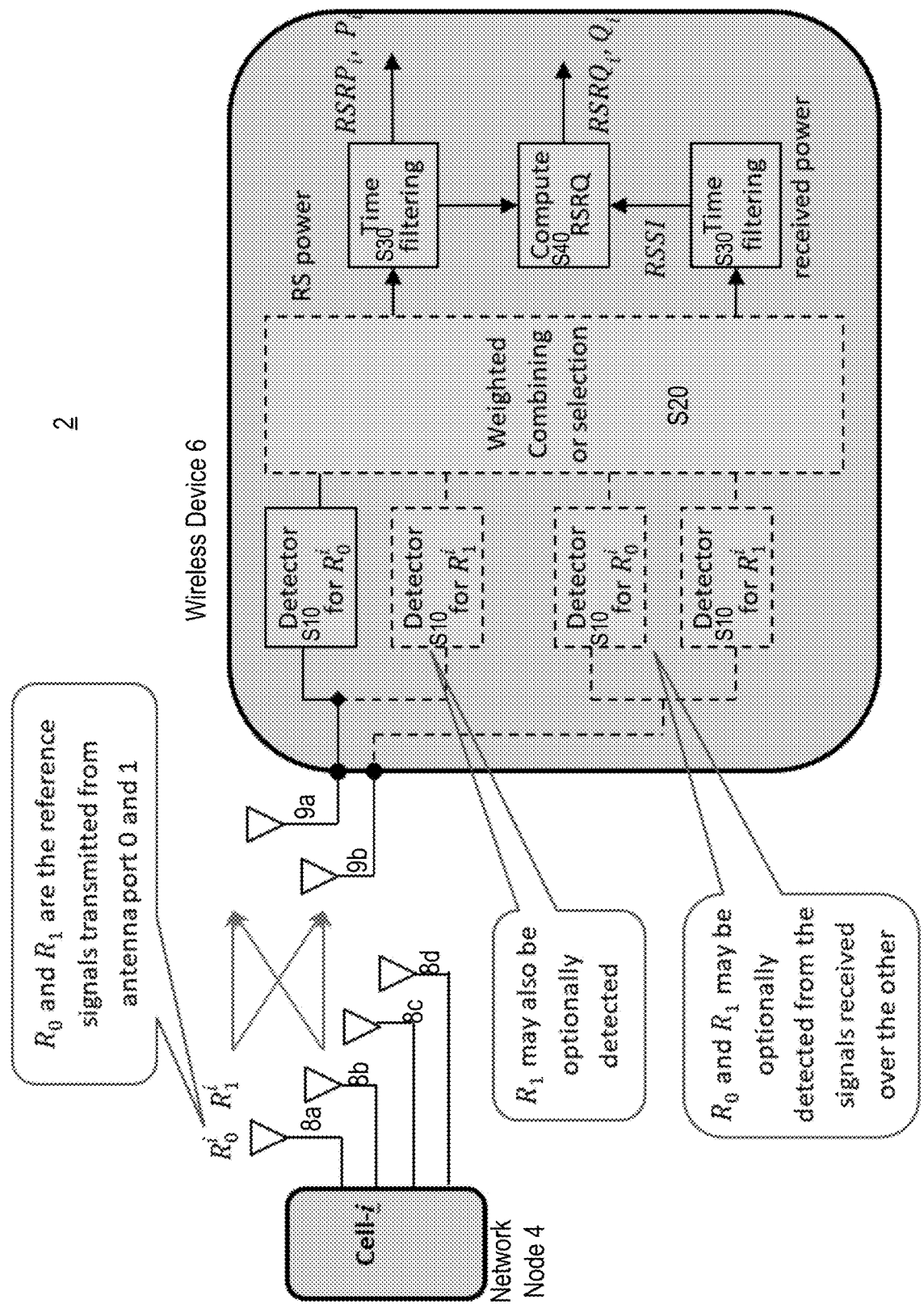
FIG. 1 is a diagram of a wireless device measurement procedure in LTE and NR.
Figure 2:
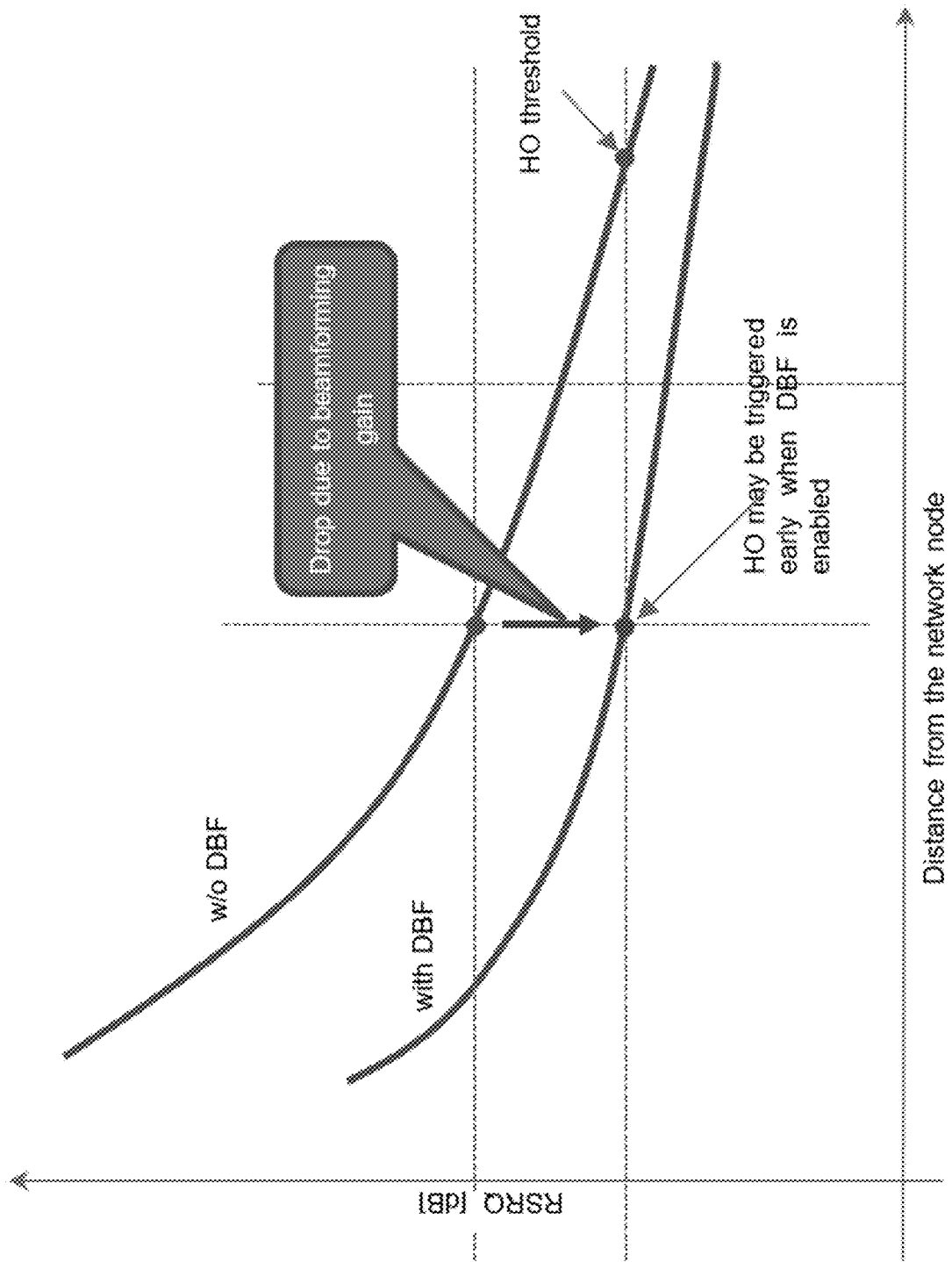
FIG. 2 is a diagram of the effect of beamforming on RSRQ.

As described above, wireless device measurements may be affected by, for example, wireless device configuration(s) where these biased measurements may lead to unnecessary network action(s). The present disclosure advantageously solves at least one of the issues with existing systems at least in part by providing one or more methods for help make the measurements uniform across the network such that the measurements may not be affected by the wireless device specific power control and/or beamforming on DL transmissions. Therefore, the present disclosure advantageously helps avoid unnecessary mobility triggering and unnecessary uplink (UL) measurement reports, at least in part by one or more of informing, indicating and communicating to the wireless device(s) the corrected and/or modified triggers, e.g., RSRQ triggers or at least criterion by which RSRQ is triggered.

Before describing in detail exemplary embodiments, it is noted that the embodiments reside primarily in combinations of apparatus components and processing steps related to modifying a trigger for measurement and/or measurement reporting. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

The term TTI used herein may correspond to any time period (T0) over which a physical channel can be encoded and interleaved for transmission. The physical channel is decoded by the receiver over the same time period (T0) over which it was encoded. The TTI may also interchangeably called as short TTI (sTTI), transmission time, slot, sub-slot, mini-slot, short subframe (SSF), mini-subframe etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or measurement report threshold and/or measurement threshold. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for modifying a trigger for measurement and/or measurement reporting.

Figure 3:
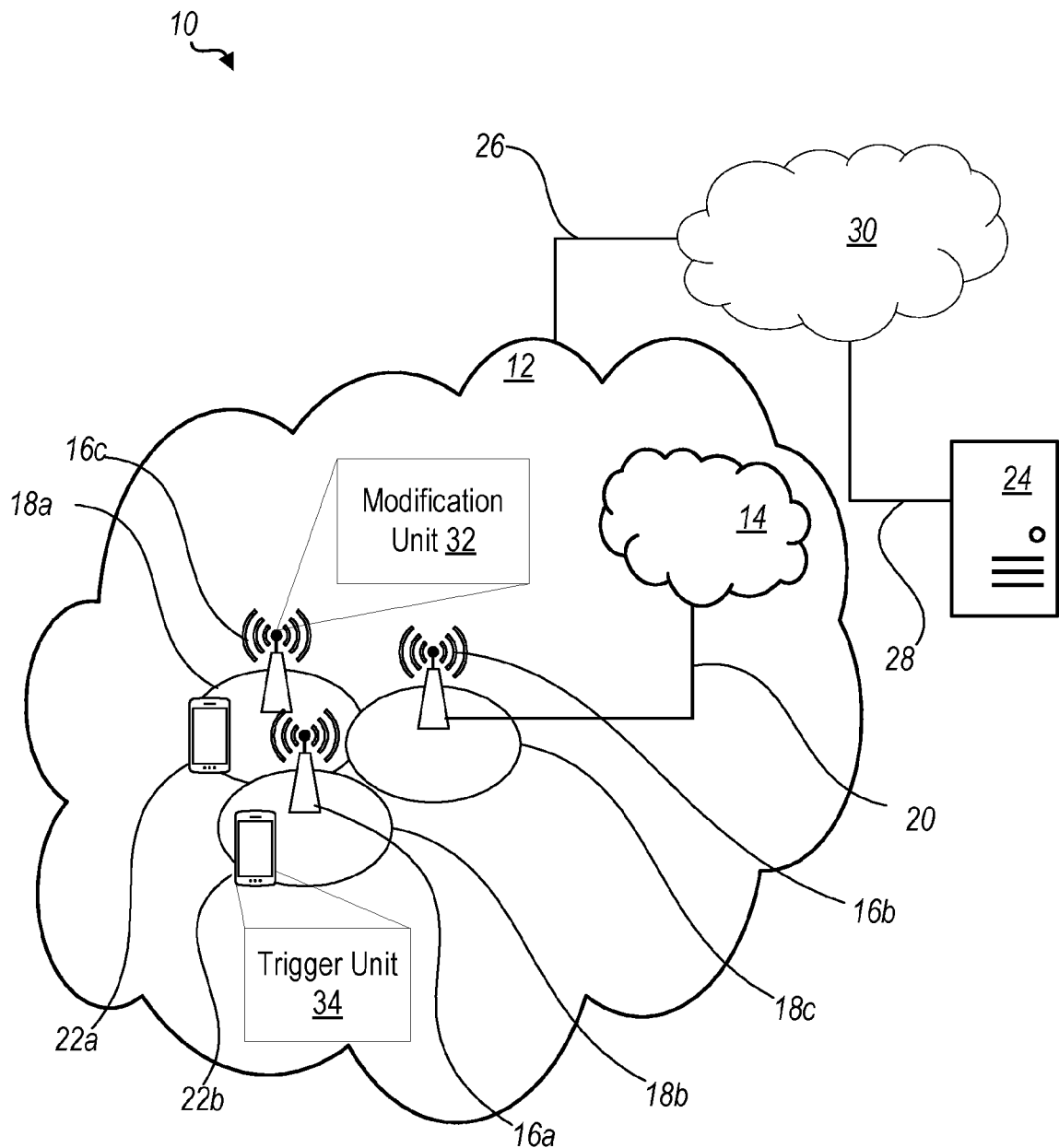
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding cell 18a, 18b, 18c (referred to collectively as cells 18). In some embodiments, cell 18 defines a coverage area. Each network node 16a, 16b, 16c is connectable to the core network 14 over a wired or wireless connection 20. A first wireless device (WD) 22a located in cell 18a is configured to wirelessly connect to, or be paged by, the corresponding network node 16c. A second WD 22b in cell 18b is wirelessly connectable to the corresponding network node 16a.

While a plurality of WDs 22a, 22b (collectively referred to as wireless devices 22) are illustrated in this example, the disclosed embodiments are equally applicable to a situation where a sole WD is in the cell or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a modification unit 32 which is configured to perform one or more network node 16 functions as described herein such as with respect to modifying a trigger for measurement and/or measurement reporting. A wireless device 22 is configured to include a trigger unit 34 which is configured to perform one or more wireless device 22 functions as described herein such as with respect to using a modified a trigger for measurement and/or measurement reporting.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine, process, store, transmit, receive, forward, relay, etc. information related to modifying a trigger for measurement and/or measurement reporting.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a cell 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include modification unit 32 configured to perform one or more network node 16 functions described herein such as with respect to modifying a trigger for measurement and/or measurement reporting.

The communication system 10 further includes the WD 22 already referred to. The WD 22 may have hardware 80 that may include a radio interface 82 configured to set up and maintain a wireless connection 64 with a network node 16 serving a cell 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a trigger unit 34 configured to perform one or more wireless device 22 functions described herein such as with respect to using a modified trigger for measurement and/or measurement reporting.

Figure 4:
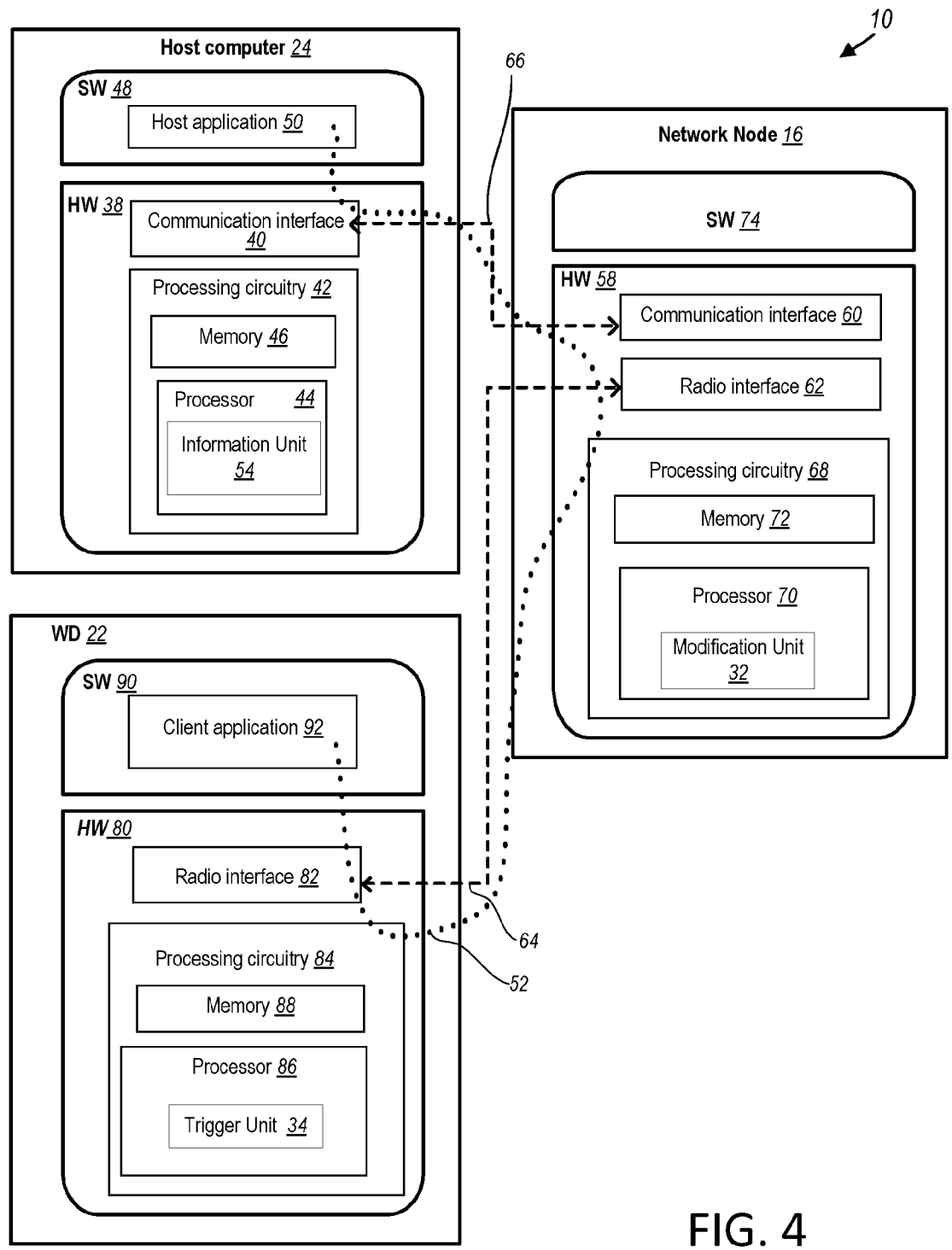
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as modification unit 32, and trigger unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
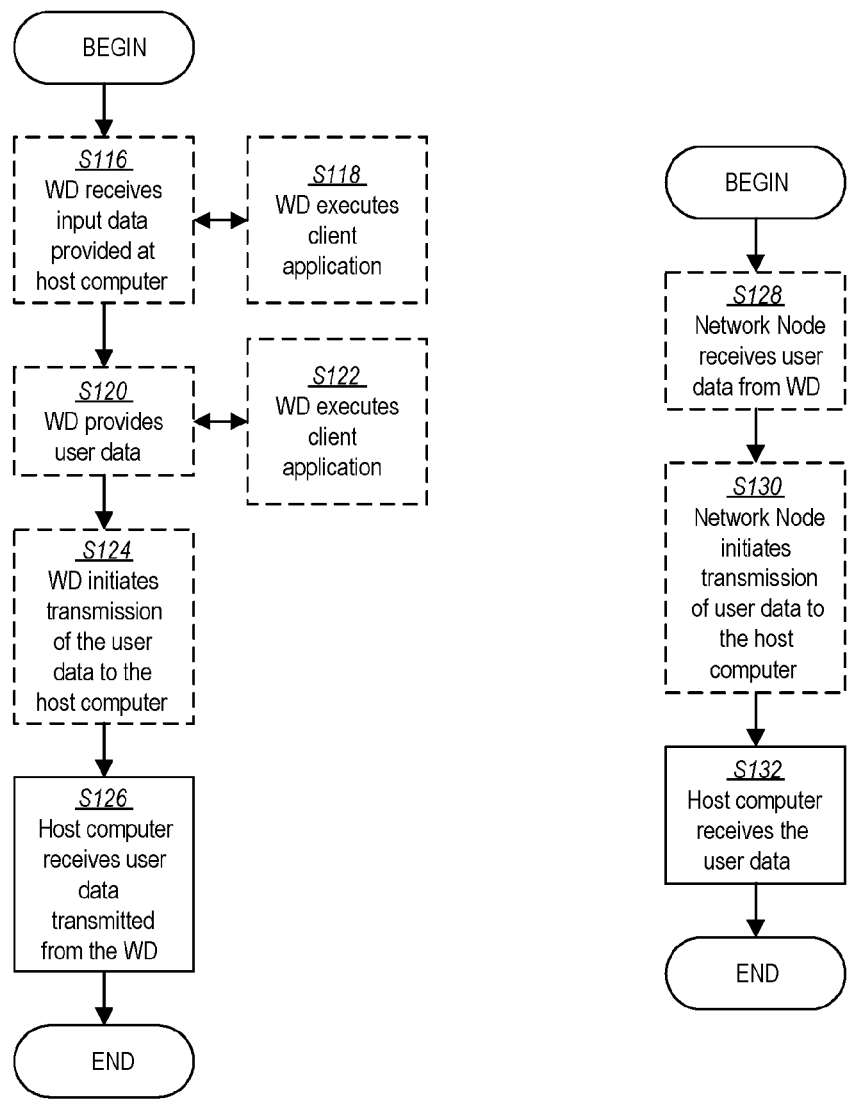
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
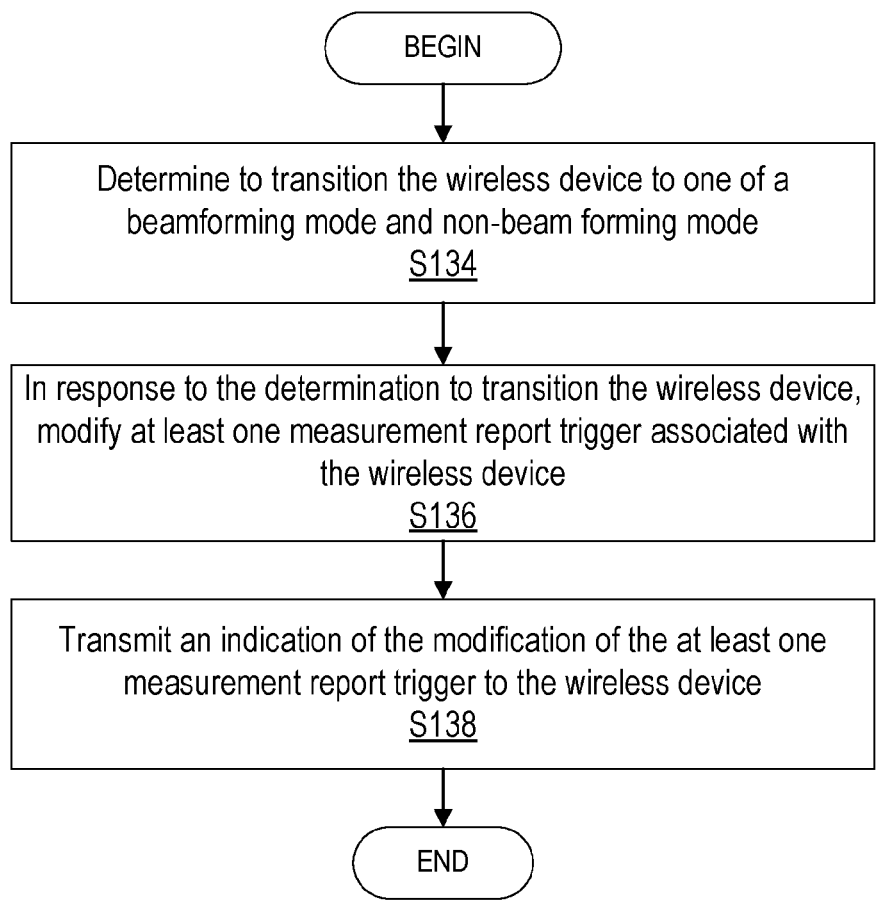
FIG. 9 is a flowchart of an exemplary process in a network node according to one or more embodiments of the present disclosure.

FIG. 9 is a flowchart of an exemplary process in a network node 16 according to one or more embodiments of the disclosure. One or more Blocks and/or functions performed by network node 16 may be performed by one or more elements of network node 16 such as by modification unit 32 in processing circuitry 68, processor 70, radio interface 62, etc. In one or more embodiments, network node 16 such as via one or more of processing circuitry 68, processor 70, communication interface 60, modification unit 32, and radio interface 62 is configured to determine (Block S134) to transition the wireless device 22 to one of a beamforming mode and non-beam forming mode, as described herein.

In one or more embodiments, network node 16 such as via one or more of processing circuitry 68, processor 70, communication interface 60, modification unit 32, and radio interface 62 is configured to, in response to the determination to transition the wireless device, modify (Block S136) at least one measurement report trigger associated with the wireless device 22, as described herein. In one or more embodiments, network node 16 such as via one or more of processing circuitry 68, processor 70, communication interface 60, modification unit 32, and radio interface 62 is configured to, in response to the determination to transition the wireless device, transmit an and/or cause transmission of (Block S138) an indication of the modification of the at least one measurement report trigger to the wireless device 22, as described herein.

According to one or more embodiments of this aspect, the processing circuitry 68 is further configured to estimate a change in a received signal strength indicator, RSSI, at the wireless device 22 where the modification of the at least one measurement report trigger being based at least in part on the estimated change in the RSSI at the wireless device 22. According to one or more embodiments of this aspect, the wireless device 22 is transitioned from a non-beamforming mode to a beamforming mode. The processing circuitry 68 is further configured to determine a power gain associated with the beamforming mode where the modification of the at least one measurement report trigger is based at least in part on the determined power gain associated with the beamforming mode. According to one or more embodiments of this aspect, the determined power gain is based at least in part on at least one of: a physical downlink shared channel, PDSCH, allocation size to the wireless device 22, a beamforming gain per at least one physical resource block, PRB, and a PDSCH transmission power with respect to a reference signal transmission power.

According to one or more embodiments of this aspect, the determined power gain is based at least in part on a weighted sum of a ratio of a PDSCH transmission power and a reference signal transmission power per physical resource block. According to one or more embodiments of this aspect, the determined power gain is based at least in part on the PDSCH power control being enabled. According to one or more embodiments of this aspect, the determined power gain is based at least in part on a ratio of the PDSCH transmission power relative to a reference signal transmission power. According to one or more embodiments of this aspect, the determined gain is based at least in part on the PDSCH transmission power control being disabled.

According to one or more embodiments of this aspect, the processing circuitry 68 is further configured to perform time filtering across a plurality of subframes associated with the ratio of the PDSCH transmission power and reference signal transmission power per physical resource block to determine an expected power gain. The determined power gain associated with the beamforming mode corresponds to the expected power gain. According to one or more embodiments of this aspect, the PDSCH transmission power corresponds to a PDSCH energy per resource element, EPRE, value and the reference signal transmission power is a cell specific reference signal, CRS, EPRE value. According to one or more embodiments of this aspect, the indication of the modification of the at least one measurement report trigger is provided by radio resource control signaling, RRC. According to one or more embodiments of this aspect, the at least one measurement report trigger corresponds to a reference signal received quality, RSRQ, measurement report trigger.

Figure 10:
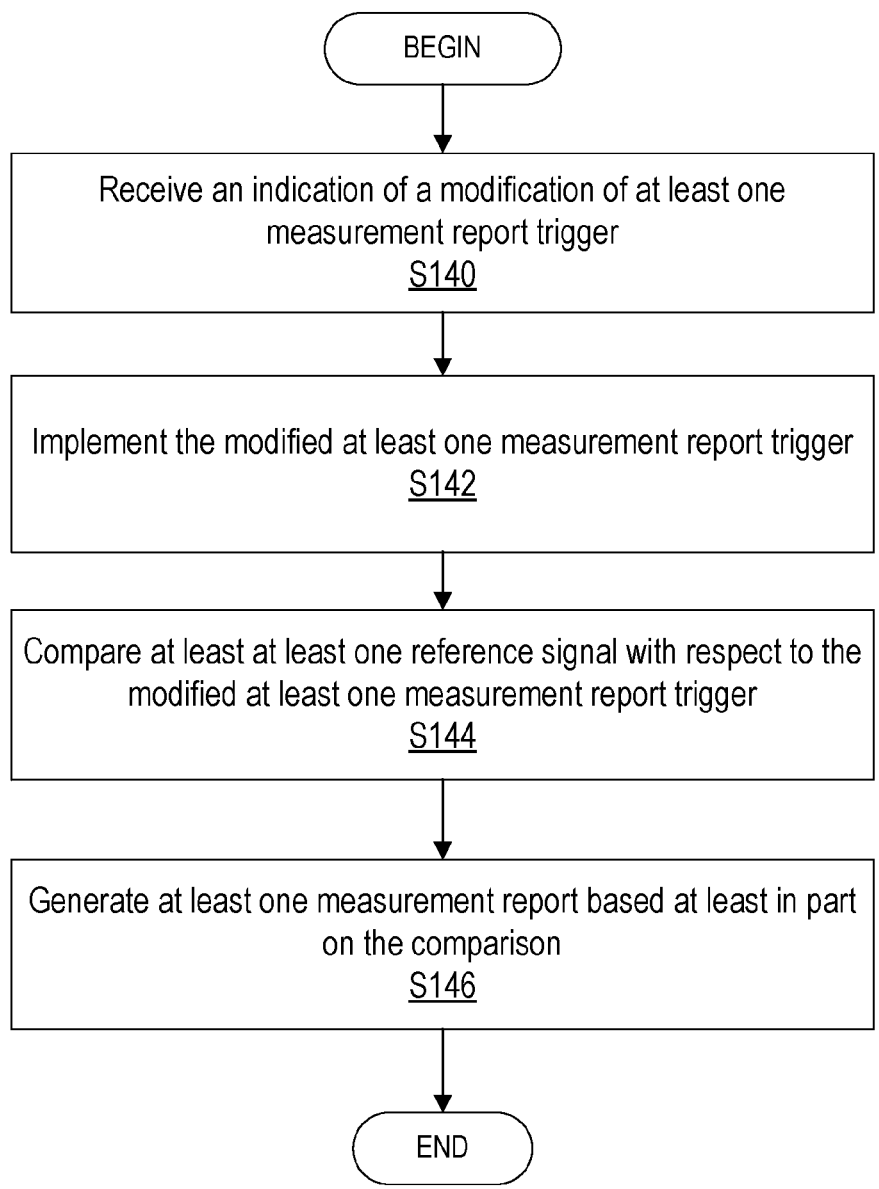
FIG. 10 is a flowchart of an exemplary process in a wireless device according to one or more embodiments of the present disclosure.

FIG. 10 is a flowchart of an exemplary process in a wireless device 22 according to one or more embodiments of the present disclosure. One or more Blocks and/or functions performed by wireless device 22 may be performed by one or more elements of wireless device 22 such as by trigger unit 34 in processing circuitry 84, processor 86, radio interface 82, etc. In one or more embodiments, wireless device 22 such as via one or more of processing circuitry 84, processor 86 and radio interface 82 is configured to receive (Block S140) an indication of a modification of at least one measurement report trigger, as described herein.

In one or more embodiments, wireless device 22 such as via one or more of processing circuitry 84, processor 86, trigger unit 34 and radio interface 82 is configured to implement (Block S142) the modified at least one measurement report trigger, as described herein. In one or more embodiments, wireless device 22 such as via one or more of processing circuitry 84, processor 86, trigger unit 34 and radio interface 82 is configured to compare (Block S144) at least at least one reference signal with respect to the modified at least one measurement report trigger, as described herein. In one or more embodiments, wireless device 22 such as via one or more of processing circuitry 84, processor 86, trigger unit 34 and radio interface 82 is configured to generate (Block S146) at least one measurement report based at least in part on the comparison, as described.

Having described the general process flow of arrangements of the disclosure and having provided examples of hardware and software arrangements for implementing the processes and functions of the disclosure, the sections below provide details and examples of arrangements for modifying a trigger for measurement and/or measurement reporting.

Embodiments provide modifying a trigger for measurement and/or measurement reporting.

Having generally described arrangements for modifying a trigger for measurement and/or measurement reporting, details for these arrangements, functions and processes are provided as follows, and which may be implemented by the network node 16, wireless device 22 and/or host computer 24.

In one or more embodiments of the disclosure advantageously provides one or more methods for helping keep RSRQ-based measurement triggers across the network consistent with each other.

RSRQ-based measurement triggering configuration, at a network node 16 such as via one or more of processing circuitry 68, processor 70, radio interface 62, modification unit 32, etc., may include one or more of: identifying a wireless device transition to digital beam forming (DBF) mode, determining a correction factor for a measurement trigger due at least in part to the DBF, modifying the measurement trigger for an event, and informing the wireless device of the modified trigger for the event. In one or more embodiments, the determining of the correction factor includes one or more of: computing the correction factor based at least in part on at least one of average resource allocation size and average expected signal power change for data transmission.

Figure 11:
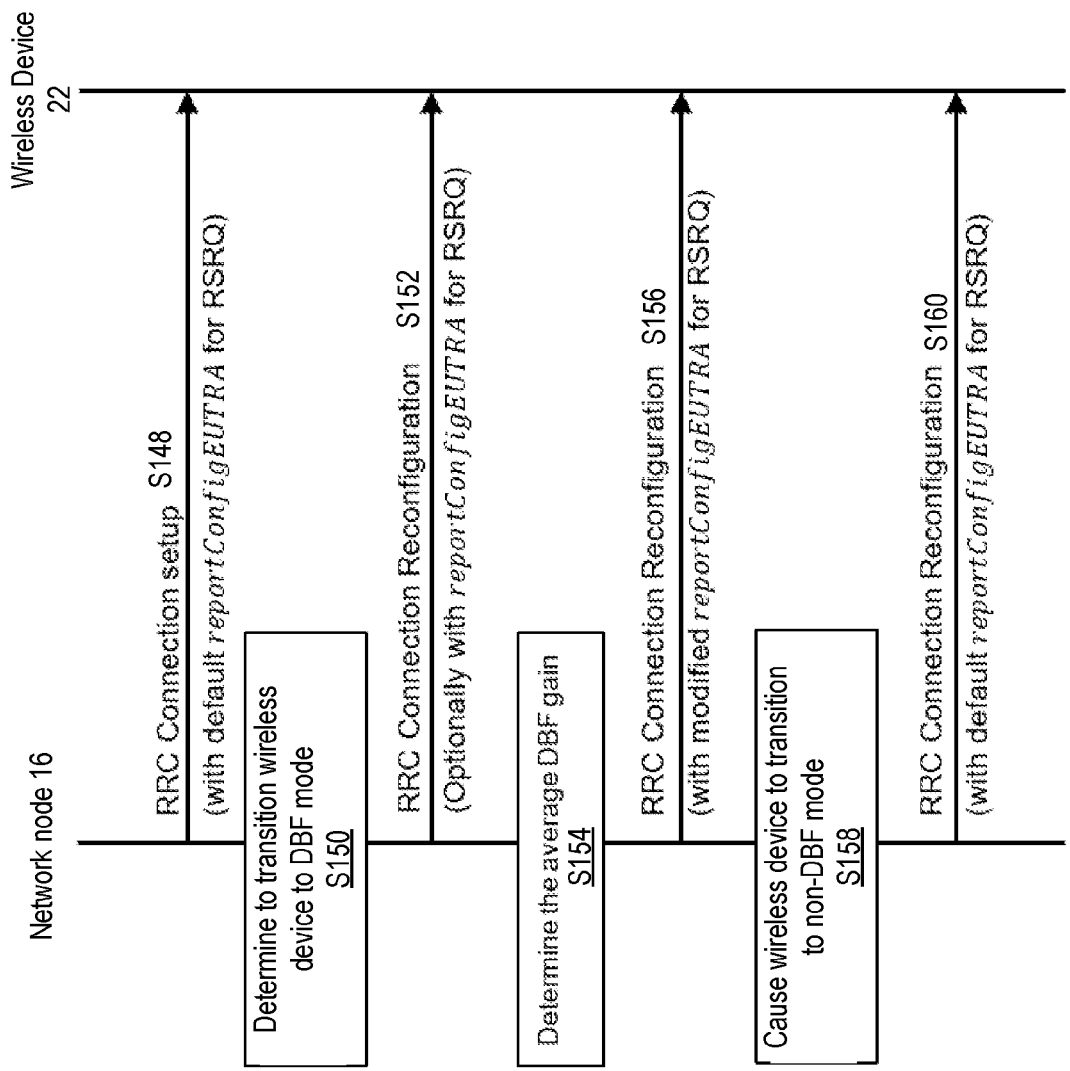
FIG. 11 is a signaling diagram according to one or more embodiments of the present disclosure.

FIG. 11 is a signaling diagram for a method for helping to prevent premature RSRQ measurement trigger according to one or more embodiments of the disclosure. In one or more embodiments, the RSRQ measurement triggers are modified by the network node 16 such as via one or more of processing circuitry 68, processor 70, radio interface 62, modification unit 32, etc., and the information about the modified triggers are sent to the wireless device 22 such as via radio interface 62 such as whenever the wireless device transitions from DBF to non-DBF and/or vice-versa. For example, in LTE, reportConfigEUTRA, i.e., a trigger for reporting in LTE, may be modified based at least in part on an estimated bias on RSRQ due to, for example, DBF. The Blocks in FIG. 11 are described below. One or more Blocks and/or functions performed by network node 16 may be performed by one or more elements of network node 16 such as by modification unit 32 in processing circuitry 68, processor 70, radio interface 62, etc. In one or more embodiments, network node 16 such as via one or more of processing circuitry 68, processor 70, communication interface 60 and radio interface 62 is configured to transmit (Block S148) a RRC connection setup with a default reportConfigEUTRA for RSRQ, as described herein. FIG. 11 is a signaling flow diagram of according to one or more embodiments of the disclosure. In one or more embodiments, the RRC connection setup message includes a default reportConfigEUTRA for RSRQ that may, for example, include a preconfigured measurement trigger.

In one or more embodiments, network node 16 such as via one or more of processing circuitry 68, processor 70, communication interface 60, modification unit 32 and radio interface 62 is configured to determine (Block S150) to cause the wireless device 22 to transition to DBF mode such as from transmission mode (TM) 3 or TM4 to TM7 or TM8 or TM9, for example, as described herein. In one or more embodiments, network node 16 such as via one or more of processing circuitry 68, processor 70, communication interface 60, modification unit 32 and radio interface 62 is configured to transmit (Block S152) a RRC connection reconfiguration that may optionally include reportConfigEUTRA for RSRQ, to the wireless device 22, as described herein. For example, when the wireless device 22 is instructed to transition to DBF mode via RRC signaling, the RRC connection Reconfiguration may optionally contain a reportConfigEUTRA IE with modified RSRQ measurement triggers. In one or more embodiments, network node 16 such as via one or more of processing circuitry 68, processor 70, communication interface 60, modification unit 32 and radio interface 62 is configured to determine (Block S154) an average DBF gain such as over a predefined period of time and/or a quantity of DBF calculations, as described herein.

In one or more embodiments, network node 16 such as via one or more of processing circuitry 68, processor 70, communication interface 60, modification unit 32 and radio interface 62 is configured to transmit (Block S156) a RRC connection reconfiguration to the wireless device 22 where the RRC connection reconfiguration includes a modified reportConfigEUTRA for RSRQ, as described herein. In other words, in one or more embodiments, the modification of the RSRQ measurement trigger may be based on an approximate estimate; therefore, once the wireless device 22 transitions to the DBF mode, the average DBF gain is determined such as via one or more of processing circuitry 68, processor 70, radio interface 62, modification unit 32, etc., and informed to the wireless device 22 in a new RRC connection reconfiguration message such as via radio interface 62. In one or more embodiments, network node 16 such as via one or more of processing circuitry 68, processor 70, communication interface 60, modification unit 32 and radio interface 62 is configured to cause (Block S158) the wireless device 22 to transition to non-DBF mode such as from TM7 or TM8 or TM9 to TM3 or TM4, for example, as described herein. In one or more embodiments, network node 16 such as via one or more of processing circuitry 68, processor 70, communication interface 60 and radio interface 62 is configured to transmit (Block S160) a RRC connection reconfiguration to the wireless device 22 where the RRC connection reconfiguration includes a default reportConfigEUTRA for RSRQ, as described herein. In one or more embodiments, while the wireless device 22 is in the DBF mode, the average DBF gain for the wireless device 22 may be constantly and/or periodically tracked and informed to the wireless device 22 such as via one or more of processing circuitry 68, processor 70, radio interface 62, modification unit 32, etc., if or when a significant change in the DBF gain is observed by, for example, the network node 16.

The difference between a non-beamformed RSRQ of the serving cell 18 measured at wireless device-u, $RSRQ_0^{u-noDbf}$, from beamformed RSRQ, $RSRQ_0^{u-dbf}$ can be expressed as follows:

$$\frac{1}{RSRQ_0^{u-noDbf}} = \frac{1}{RSRQ_0^{u-dbf}} + E\left[\frac{1}{N_{RB}^{DL-R}}\sum_{m=0}^{N_{RB}^{DL-R}-1}\rho_B(0, m)(1 - G_{0,m}^u)\right] \quad (2)$$

where $\rho_B(0, m)$ is the ratio of PDSCH EPRE to CRS EPRE with respect the serving cell-0 on resource -m. $N_{RM}^{DL-R}$ represents the measurement bandwidth of RSRQ expressed in number of Physical Resource Blocks (PRBs).

When $\rho_B(0, m)$ is configured to be the same for all the wireless devices 22 (e.g., wireless devices 22 served by a serving cell), equation (2) can be simplified to equation (3) described below.

$$\frac{1}{RSRQ_0^{u-noDBF}} = \frac{1}{RSRQ_0^{u-dbf}} + E[\rho_B(0)\{\alpha^u(1 - \bar{G}_0^u)\}] \quad (3)$$

where
  $\alpha^u$ is the share of PRBs allocated to wireless device-u out of $N_{RB}^{DL-R}$
  $\bar{G}_0^u$ is the average DBF gain estimated to be provided to wireless device-u
  $\rho_B(0)$ is the ratio of PDSCH EPRE to the CRS EPRE.
  E[ ] represents the expectation operator, which can be approximated as time filtering in one or more embodiments such as to provide an expected gain factor as described herein.

Figure 12:
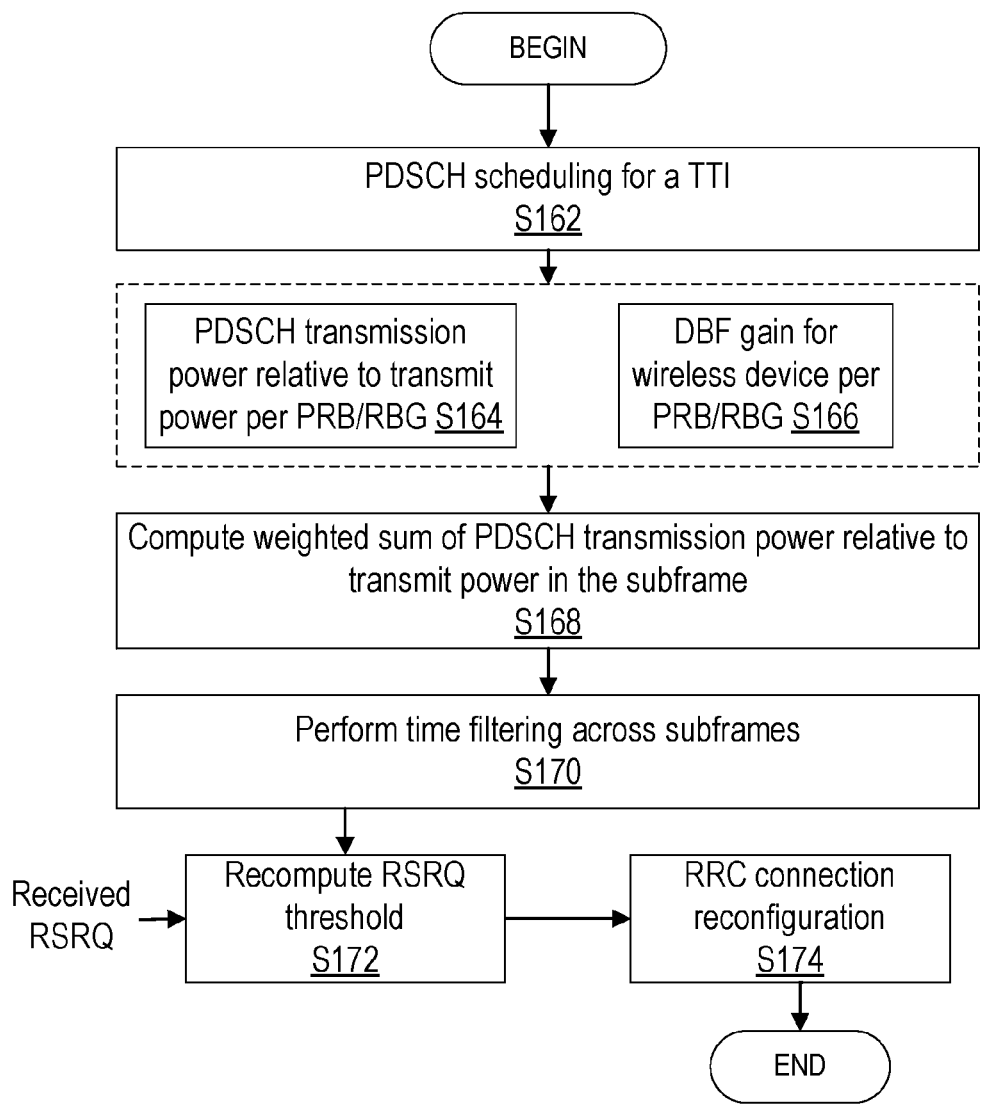
FIG. 12 is another flowchart of an exemplary process in a network node according to one or more embodiments of the present disclosure.

FIG. 12 is flow diagram of an example procedure for estimating a power gain factor according to one or more embodiments of the disclosure such as when the PDSCH power control is enabled. One or more Blocks and/or functions performed by network node 16 may be performed by one or more elements of network node 16 such as by modification unit 32 in processing circuitry 68, processor 70, radio interface 62, etc. In one or more embodiments, network node 16 such as via one or more of processing circuitry 68, processor 70, communication interface 60, modification unit 32 and radio interface 62 is configured to perform (Block S162) PDSCH scheduling for a transmission time interval (TTI). In one or more embodiments, network node 16 such as via one or more of processing circuitry 68, processor 70, communication interface 60, modification unit 32 and radio interface 62 is configured to determine (Block S164) PDSCH transmission power relative to transmit power per PRB/RBG, as described herein. In one or more embodiments, network node 16 such as via one or more of processing circuitry 68, processor 70, communication interface 60, modification unit 32 and radio interface 62 is configured to determine (Block S164) DBF gain for wireless device 22 per PRB/RBG, as described herein. In one or more embodiments, Blocks S164 and S166 may be based on measurement(s) triggered by an event occurrence, such as based on a predefined measurement trigger.

In one or more embodiments, network node 16 such as via one or more of processing circuitry 68, processor 70, communication interface 60, modification unit 32 and radio interface 62 is configured to compute (Block S168) a weighted sum of PDSCH transmission power relative to transmit power in the subframe, as described herein. In one or more embodiments, network node 16 such as via one or more of processing circuitry 68, processor 70, communication interface 60, modification unit 32 and radio interface 62 is configured to perform (Block S170) time filtering across subframes, as described herein. In one or more embodiments, network node 16 such as via one or more of processing circuitry 68, processor 70, communication interface 60, modification unit 32 and radio interface 62 is configured to a recompute (Block S172) RSRQ threshold such as based at least in part on the time filtering of Block S170 and a received RSRQ, as described herein.

In one or more embodiments, network node 16 such as via one or more of processing circuitry 68, processor 70, communication interface 60, modification unit 32 and radio interface 62 is configured to provide (Block S174) a RRC connection reconfiguration message/signaling to the wireless device 22, as described herein. For example, the RRC connection reconfiguration message/signaling may indicate the modified, i.e., recomputed, RSRQ threshold such that the wireless device 22 may use the modified RSRQ threshold for triggering an event such as a measurement report.

In particular, the time filtering of the weighted sum of PDSCH transmission power relative to the transmit power in the subframe provides an estimate of the power gain factor (also referred to as power gain). The power gain factor may be expressed as:

$$E\left[\frac{1}{N_{RB}^{DL-R}}\sum_{m=0}^{N_{RB}^{DL-R}-1}\rho_B(0, m)(1 - G_{0,m}^u)\right]$$

in equation (4) at the network node 16. In particular, based on the PDSCH allocation size, DBF gain per PRB or RBG and PDSCH transmission power with respect to the reference signal transmission power, the gain factor is estimated. The E[ ] operation or the time filtering is performed over the subframes such as to determine the expected power gain factor or power gain. Time filtering can be performed as an exponential averaging. The parameter used for exponential averaging, for example, can be related to the Layer 3 (L3) filtering parameter that is sent to the wireless device 22 by the network node 16.

Figure 13:
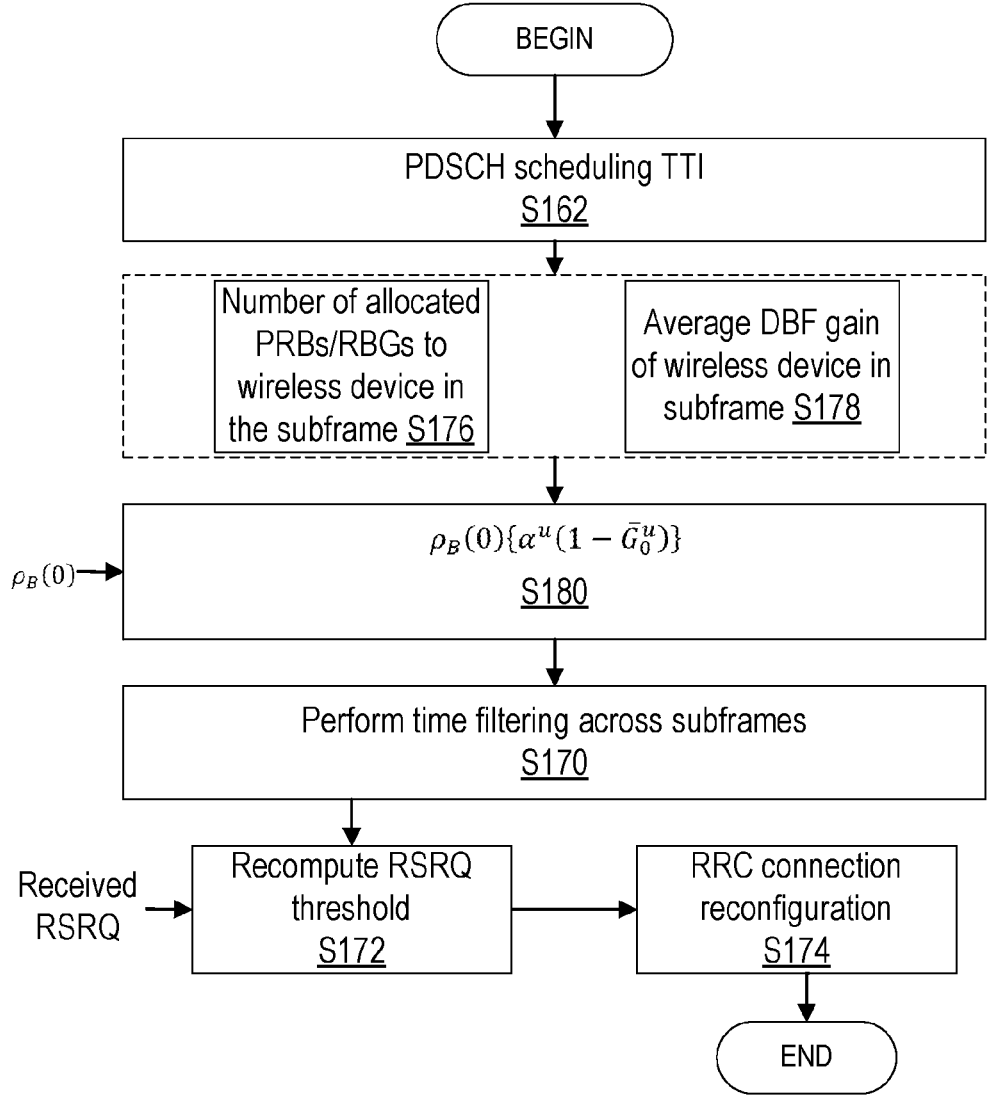
FIG. 13 is yet another flowchart of an exemplary process in a network node according to one or more embodiments of the present disclosure.

FIG. 13 is flow diagram of a procedure for estimating a power gain factor according to one or more embodiments of the disclosure such as when the PDSCH power control is not enabled or disabled. One or more Blocks and/or functions performed by network node 16 may be performed by one or more elements of network node 16 such as by modification unit 32 in processing circuitry 68, processor 70, radio interface 62, etc. Block S162 is described above with respect to FIG. 12. In one or more embodiments, network node 16 such as via one or more of processing circuitry 68, processor 70, communication interface 60, modification unit 32 and radio interface 62 is configured to determine (Block S176) a number of allocated PRBs/RBGs to the wireless device in the subframe, as described herein. In one or more embodiments, network node 16 such as via one or more of processing circuitry 68, processor 70, communication interface 60, modification unit 32 and radio interface 62 is configured to averages (Block S178) DBF gain of wireless device 22 in the subframe, as described herein.

In one or more embodiments, network node 16 such as via one or more of processing circuitry 68, processor 70, communication interface 60, modification unit 32 and radio interface 62 is configured to determine (Block S180) a ratio of PDSCH energy per resource element (EPRE) to CRS EPRE with respect to serving cell-0 on resource m, as described herein. Blocks S170-174 are the same as described in FIG. 12 except that the recomputed RSRQ threshold in FIG. 13 is based on Block S180.

Additional Details to Aid Understanding of the Disclosure are Provided as Follows:

The gain due to DBF can be measured as follows:

$$\frac{1}{M}\sum_{m} \max\{E^m_{PMI-dbf}(\theta, \phi) - E^m_{PMI-nonDbf}(\theta, \phi)\} \quad (4)$$

where $E_{PMI-dbf}^m(\theta, \phi)$ and $E_{PMI-nonDbf}^m(\theta, \phi)$ are the expected relative radiated power in the direction $(\theta, \phi)$ on resource in. M represents the allocation size in number of resources. $\theta$ and $\phi$ are the elevation and azimuth angles relative to the network node respectively.

For example, when a wireless device 22 is transitioning from TM4 or TM3 to TM9, $E_{PMI-nonDbf}^m(\theta, \phi)$ represents the normalized spatial spectrum of one of the TM4 or TM3 precoder multiplied with common beam forming weights and $E_{PMI-dbf}^m(\theta, \phi)$ represents the normalized spatial spectrum of one of the precoder derived at the network node 16 multiplied with common beam forming weights.

In one or more embodiments, the DBF gain can be estimated as follows.

$$\max\{E_{PMI-dbf}(\theta,\phi) - E_{PMI-nonDbf}(\theta,\phi)\} \quad (4)$$

For example, when a wireless device 22 is transitioning from TM4 to TM9, where $E_{PMI-nonDbf}(\theta, \phi)$ represents the normalized spatial spectrum of one of the TM4 precoders multiplied with common beam forming weights and $E_{PMI-dbf}(\theta, \phi)$ represents the normalized spatial spectrum of one of the TM9 precoders multiplied with common beam forming weights. The precoder selected for TM4 or TM9 can be one or more of the precoders predefined in 3GPP standards and computed at the network node 16.

Alternate Example

According to an alternate example, the wireless device 22 measurement procedures that are affected by power control and/or beamforming on DL transmissions are corrected by:
estimating, by the network node such as via one or more of processing circuitry 68, processor 70, radio interface 62, modification unit 32, etc., the increase in RSSI at the wireless device 22;
computing the change in RSRQ trigger such as via one or more of processing circuitry 68, processor 70, radio interface 62, modification unit 32, etc.; and
applying the change in event decision making, such as hand-over, such as via one or more of processing circuitry 68, processor 70, radio interface 62, modification unit 32, etc.

Figure 14:
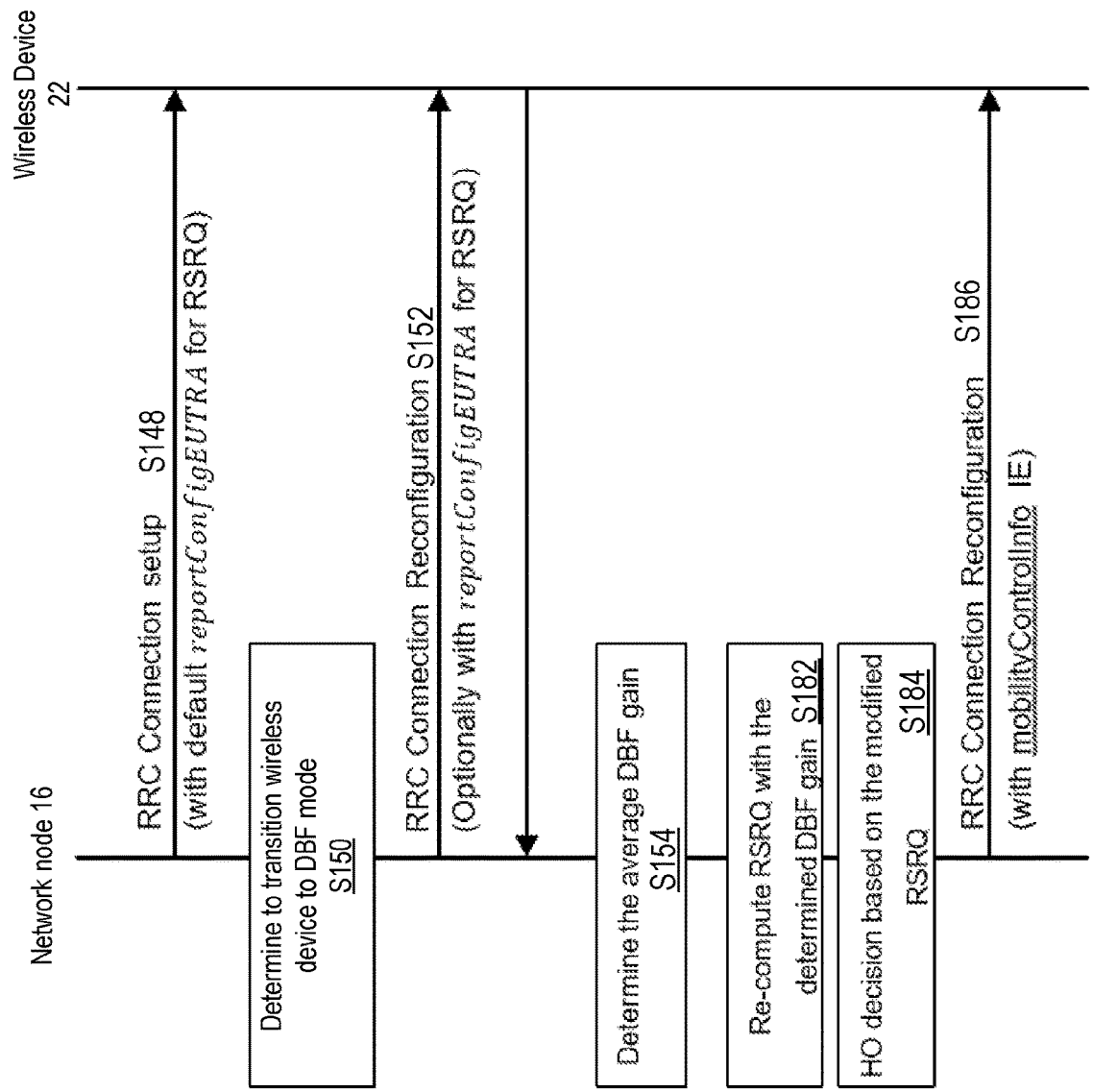
FIG. 14 is another signaling diagram according to one or more embodiments of the present disclosure.

FIG. 14 is a flow diagram of an example method for helping prevent premature handover according to one or more embodiments of the disclosure. One or more Blocks and/or functions performed by network node 16 may be performed by one or more elements of network node 16 such as by modification unit 32 in processing circuitry 68, processor 70, radio interface 62, etc. Blocks S148-154 are described above with respect to FIG. 11.

In one or more embodiments, network node 16 such as via one or more of processing circuitry 68, processor 70, communication interface 60 and radio interface 62 is configured to re-compute (Block S182) RSRQ with the determined DBF gain, as described herein. In one or more embodiments, network node 16 such as via one or more of processing circuitry 68, processor 70, communication interface 60 and radio interface 62 is configured to perform (Block S184) a handover decision based at least in part on the modified RSRQ, as described herein. For example, the modified RSRQ threshold advantageously allows the handover decision to be made using a threshold that more accurately reflects the system configuration when compared to thresholds used in existing systems. In one or more embodiments, network node 16 such as via one or more of processing circuitry 68, processor 70, communication interface 60 and radio interface 62 is configured to transmit (Block S186) a RRC connection reconfiguration message with mobility-Controlinfo IE, as described herein.

Quantification of RSRQ Degradation due to DBF and DL Power Control

In the discussion below it may be assumed that there are M intra-frequency cells where cell-0 is assumed to be the serving cell for one or more wireless devices 22. The RSRQ measured by wireless device-u with respect to the serving cell-0, $RSRQ_0^u$, can be expressed as follows.

$$RSRQ_0^u = \frac{RSRP_0^u}{RSSI^u} \quad (5)$$

where $RSRP_0^u$ is the RSRP measured by the wireless device-u with respect to cell-0 and $RSSI^u$ is the sum of average received power per PRB from all M intra-frequency cells including the serving cell-0. RSSI may be a measurement per carrier frequency per PRB for all the cells, thus is not denoted with subscript "0".

RSSI when DL Power Control and DBF is Not Enabled

Since RSRP and RSSI are measured over the OFDM symbols that consist of reference symbols for antenna port-0 (optionally other ports), $RSSI^u$ can further be expressed as a sum of average received powers over CRS REs and PDSCH REs in a PRB as follows:

$$RSSI^u = \sum_{i=0}^{M-1} \overline{P}_{RE}^{CRS}(i)N_{RE}^{CRS}(i) + \sum_{i=0}^{M-1} \overline{P}_{RE}^{PDSCH}(i)N_{RE}^{PDSCH}(i) \quad (6)$$

$$RSSI^u = \sum_{i=0}^{M-1} \overline{P}_{RE}^{CRS}(i)\{N_{RE}^{CRS}(i) + \overline{\rho}_B(i)N_{RE}^{PDSCH}(i)\}$$

where $\overline{P}_{RE}^{CRS}(i)$, $\overline{P}_{RE}^{PDSCH}(i)$ are the average received power per RE of the CRS and PDSCH transmitted from cell-i respectively. $N_{RE}^{CRS}(i)$, $N_{RE}^{PDSCH}(i)$ are the number of CRS REs and PDSCH REs per PRB from cell-i respectively. $\overline{\rho}_B(i)$ represents the average transmit power scaling for PDSCH RE over the transmit power of CRS RE for cell i, expressed as follows:

$$\overline{\rho}_B(i) = E\left[\frac{\rho_B(i)}{N_{RB}^{DL-R}} \sum_{m=0}^{N_{RB}^{DL-R}-1} D_{i,m}\right] \quad (7)$$

$$D_{i,m} = \begin{cases} 1 & \text{if the PRB is assigned to a UE} \\ 0 & \text{Otherwise} \end{cases}$$

where $N_{PRB}^{DL-R}$ is the number of PRBs of E-UTRA carrier RSSI measurement bandwidth (signaled by the network node 16). E[ ] represents the expectation operation, which can be approximated as time-filtering in one or more embodiments. $\rho_B(i)$ is the ratio of PDSCH EPRE to CRS EPRE (which may not be applicable to PDSCH REs with zero EPRE) in cell-i on OFDM symbols with CRS. In equation (3), $\rho_B(i)$ is the same for all the connected wireless devices 22; however, this parameter can be wireless device 22 specific in which case, equation (3) can be rewritten as follows:

$$\overline{\rho}_B(i) = E\left[\frac{1}{N_{RB}^{DL-R}} \sum_{m=0}^{N_{RB}^{DL-R}-1} \rho_B(i,m)D_{i,m}\right] \quad (8)$$

where $\rho_B(i, m)$ is the is the ratio of PDSCH EPRE to CRS EPRE on PRB-m in cell-i.

RSSI when DL Power Control or DBF is Enabled

When PDSCH is beamformed, then the formulation in equation (2) can be modified as follows:

$$RSSI^u = \sum_{i=0}^{M-1} \overline{P}_{RE}^{CRS}(i)\{N_{RE}^{CRS}(i) + \overline{\rho}_B^u(i)N_{RE}^{PDSCH}(i)\}$$

where $\overline{\rho}_B^u(i)$ is now a function of the wireless device 22, which can be expressed as follows:

$$\overline{\rho}_B^u(i) = E\left[\frac{1}{N_{RB}^{DL-R}} \sum_{m=0}^{N_{RB}^{DL-R}-1} \rho_B(i,m)G_{i,m}^u\right] \quad (9)$$

when i is not the serving cell
  $G_{i,j}^u=1$ when the PRB-j is assigned to a wireless device 22 in cell-i
  $G_{i,j}^u=0$ when the PRB-j is not assigned to any wireless device 22 in cell-i when i is the serving cell 18
  $G_{0,j}^u=1$ when the PRB-j is assigned to another wireless device 22 by the serving cell 18
  $G_{0,j}^u=0$ when the PRB-j is not assigned to any wireless device 22 by the serving cell 18
  $G_{0,j}^u=G^u$ when the PRB-j is assigned to the wireless device-u by the serving cell 18

In one or more embodiments, the beamforming gain with respect to the serving cell 18, may be $G^u \geq 1$ and $G^u=0$ or 1 for all the other cells 18.

Effect of DBF on RSRQ

RSSI, described above, can be rewritten to separate the contribution, e.g., gain or power contribution, of the serving cell 18 from other interfering cells as follows:

$$RSSI^u = \underbrace{\overline{P}_{RE}^{CRS}(0)\{N_{RE}^{CRS}(0) + \overline{\rho}_B^u(0)N_{RE}^{PDSCH}(0)\}}_{\text{contribution from the serving cell}} +$$

$$\underbrace{\sum_{i=1}^{M-1} \overline{P}_{RE}^{CRS}(i)\{N_{RE}^{CRS}(i) + \overline{\rho}_B(i)N_{RE}^{PDSCH}(i)\}}_{\text{contribution from the co-channel cells}}$$

Since $RSRP=\overline{P}_{RE}^{CRS}(0)$, the above equation can be expressed as:

$$RSSI^u = RSRP_0\underbrace{\{N_{RE}^{CRS}(0) + \overline{\rho}_B^u(0)N_{RE}^{PDSCH}(0)\}}_{\text{Load factor of the serving cell}} +$$

$$\underbrace{\sum_{i=1}^{M-1} \overline{P}_{RE}^{CRS}(i)\{N_{RE}^{CRS}(i) + \overline{\rho}_B(i)N_{RE}^{PDSCH}(i)\}}_{\text{average intra-frequency interference}}$$

where this equation may be further interpreted as follows:

$$RSSI^u = RSRP_0^u * L_0^u + P_I^u \quad (10)$$

where $P_I^u$ represents the average interference from co-channel cells and noise measurement. $L_0^u$ represents the average DL load dependent fraction of the received power at the input of the wireless device 22's antenna port on the OFDM symbol with CRS from the serving cell 18 defined as follows:

$$\overline{\rho}_B^u(0) = E\left[\frac{1}{N_{RB}^{DL-R}} \sum_{m=0}^{N_{RB}^{DL-R}-1} \rho_B(0,m)G_{0,m}^u\right] \quad (11)$$

when $\rho_B(0, m)$ is configured to be the same for all the wireless devices 22, equation (7) can be expressed as follows:

$$\overline{\rho}_B^u(0) = E[\rho_B(0)\{\overline{G}_0^u * \alpha^u + \beta\}] \quad (12)$$

where $\alpha^u$ and $\beta$ represent the fraction of number of PRBs assigned to wireless device u and other wireless devices, respectively, i.e., $\alpha^u + \beta \leq 1$. $\overline{G}_0^u$ is the average DBF gain across the measurement bandwidth for wireless device-u with respect to the serving cell-0.

RSRQ with and without DBF, respectively, can be expressed as follows.

$$\frac{1}{RSRQ_0^{u-dbf}} = L_0^{u-dbf} + \frac{P_I^u}{RSRP_0^u}$$

-continued $$\frac{1}{RSRQ_0^{u-noDbf}} = L_0^{u-noDbf} + \frac{P_I^u}{RSRP_0^u}$$

where $L_0^{u-dbf}$ and $L_0^{u-noDBF}$ are where expressed as follows:

$$L_0^{u-dbf} = N_{RE}^{CRS}(0) + E\left[\frac{1}{N_{RB}^{DL-R}} \sum_{m=0}^{N_{RB}^{DL-R}-1} \rho_B(0,m) G_{0,m}^u \right] N_{RE}^{PDSCH}(0)$$

$$L_0^{u-noDBF} = N_{RE}^{CRS}(0) + E\left[\frac{1}{N_{RB}^{DL-R}} \sum_{m=0}^{N_{RB}^{DL-R}-1} \rho_B(0,m)\right] N_{RE}^{PDSCH}(0)$$

From the above formulation, the non-beamformed RSRQ, $RSRQ^{noDbf}$, can be computed from beamformed RSRQ, $RSRQ^{dbf}$ as follows:

$$\frac{1}{RSRQ_0^{u-noDbf}} = \frac{1}{RSRQ_0^{u-dbf}} + L_0^{u-noDbt} - L_0^{u-dbf} \quad (13)$$

$$\frac{1}{RSRQ_0^{u-noDbf}} = \frac{1}{RSRQ_0^{u-dbf}} + E\left[\frac{1}{N_{RB}^{DL-R}} \sum_{m=0}^{N_{RB}^{DL-R}-1} \rho_B(0,m)\left(1 - G_{0,m}^u\right)\right]$$

when $\rho_B(0, m)$ is configured same for all the wireless devices 22, equation (9) can be simplified, as follows:

$$\frac{1}{RSRQ_0^{u-noDBF}} = \frac{1}{RSRQ_0^{u-dbf}} + E[\rho_B(0)\{\alpha^u(1 - \overline{G}_0^u)\}] \quad (14)$$

Figure 15:
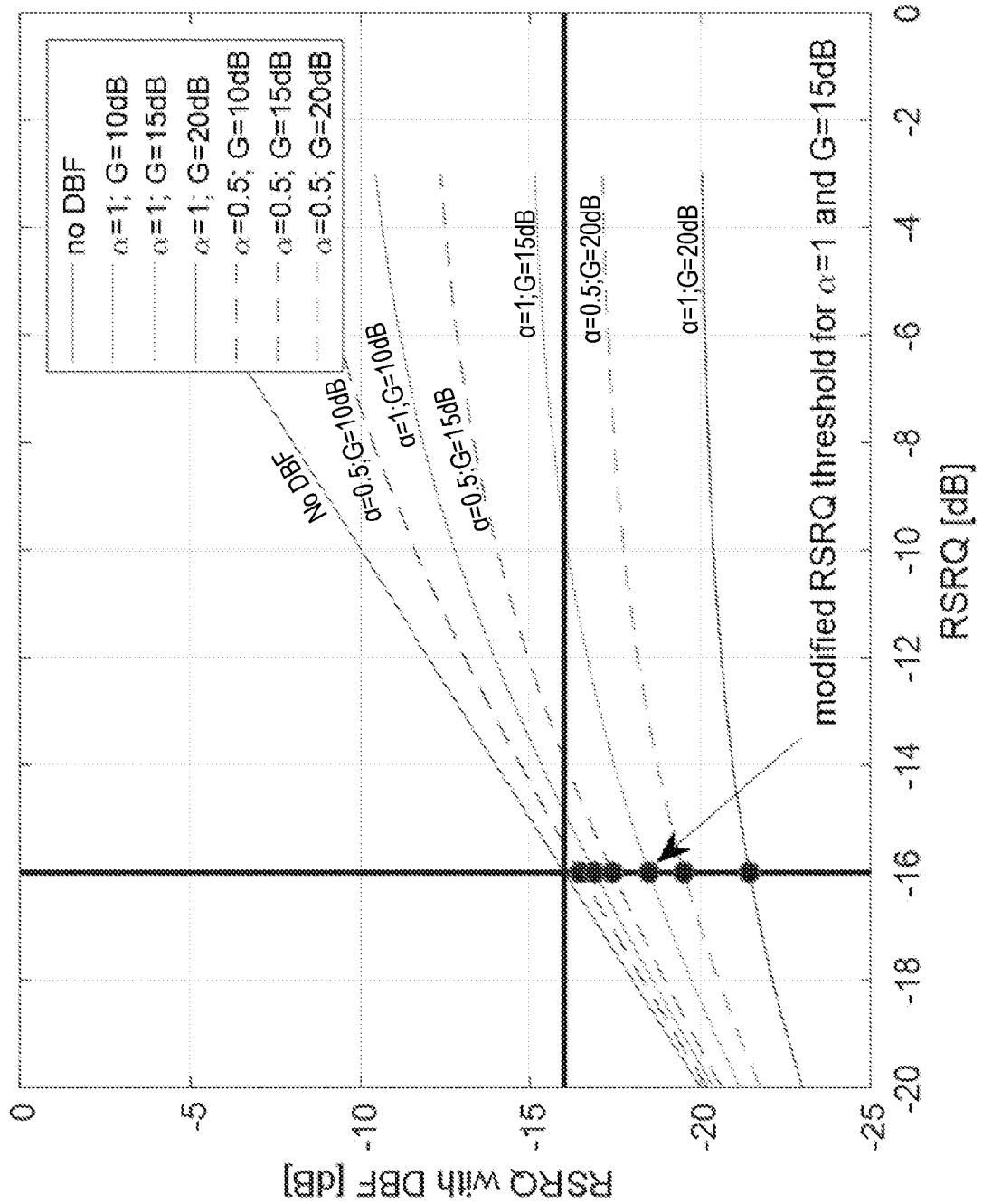
FIG. 15 is a diagram of a change in RSRQ due at least in part to DBF gain.

$\alpha^u$ is the share of PRBs allocated to wireless device-u out of $N_{RB}^{DL-R}$ $\overline{G}_0^u$ is the average DBF gain estimated to be provided to wireless device-u FIG. 15 is a diagram of the change in RSRQ due to DBF gain for different resource allocation ratios according to one or more embodiments of the disclosure. In one or more embodiments, $\rho_B(0, m)$ is assumed to be unity. As illustrated in FIG. 15, the change in RSRQ is smaller at lower RSRQ range when compared to the change at higher RSRQ range.

Therefore, in one or more embodiments the network node 16 advantageously modifies a measurement and/or measurement reporting trigger of a wireless device 22 such as a modified reportConfigEUTRA such as to, for example, compensate or take into account a transmission bias for a wireless device 22. The transmission bias may include wireless device 22 specific DBF and/or power control that may increase the power received at the specific wireless device 22 while other wireless devices may not detect the power increase.

EXAMPLES

Example 1

A method of RSRQ-based measurement triggering at a network node 16 comprising:
identifying such as via one or more of processing circuitry 68, processor 70, radio interface 62, modification unit 32, etc., a wireless device 22 transition to DBF mode;
determining such as via one or more of processing circuitry 68, processor 70, radio interface 62, modification unit 32, etc., a correction factor for measurement trigger due to DBF;
modifying such as via one or more of processing circuitry 68, processor 70, radio interface 62, modification unit 32, etc., the measurement trigger event; and
informing such as via one or more of processing circuitry 68, processor 70, radio interface 62, modification unit 32, etc., the wireless device 22 about the modified trigger event.

Example 2

The method of Example 1, wherein determining a correction factor includes computing the correction factor based on at least one of average resource allocation size and average expected signal power change for data transmission.

Abbreviations that may be used in the preceding description include:

| Abbreviation | Explanation |
| --- | --- |
| AAS | Adaptive Antenna Systems |
| DBF | Digital BeamForming |
| DL | Down-Link |
| CRS | Cell-specific Reference Signal |
| CSI-RS | Channel Status Indicator-Reference Signal |
| HO | Hand-Over |
| LTE-A | Long Term Evolution-Advanced |
| NR | New Radio |
| PDSCH | Physical Downlink Shared Channel |
| PRB | Physical Resource Block |
| RSRQ | Reference Signal Receive Quality |
| RSRP | Reference Signal Receive Power |
| RSSI | Reference Signal Strength Indicator |
| UE | User Equipment |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising processing circuitry configured to:

determine to transition the wireless device to one of a beamforming mode and non-beam forming mode;

in response to the determination to transition the wireless device, modify at least one measurement report trigger associated with the wireless device; and transmit an indication of the modification of the at least one measurement report trigger to the wireless device.

2. The network node of claim 1, wherein the processing circuitry is further configured to estimate a change in a received signal strength indicator, RSSI, at the wireless device, the modification of the at least one measurement report trigger being based at least in part on the estimated change in the RSSI at the wireless device.

3. The network node of claim 1, wherein the wireless device is transitioned from a non-beamforming mode to a beamforming mode; and the processing circuitry being further configured to determine a power gain associated with the beamforming mode, the modification of the at least one measurement report trigger being based at least in part on the determined power gain associated with the beamforming mode.

4. The network node of claim 3, wherein the determined power gain is based at least in part on at least one of:

a physical downlink shared channel, PDSCH, allocation size to the wireless device;

a beamforming gain per at least one physical resource block, PRB; and a PDSCH transmission power with respect to a reference signal transmission power.

5. The network node of claim 3, wherein the determined power gain is based at least in part on a weighted sum of a ratio of a PDSCH transmission power and a reference signal transmission power per physical resource block.

6. The network node of claim 5, wherein the determined power gain is based at least in part on the PDSCH power control being enabled.

7. The network node of claim 5, wherein the processing circuitry is further configured to perform time filtering across a plurality of subframes associated with the ratio of the PDSCH transmission power and reference signal transmission power per physical resource block to determine an expected power gain; and the determined power gain associated with the beamforming mode corresponding to the expected power gain.

8. The network node of claim 3, wherein the determined power gain is based at least in part on a ratio of the PDSCH transmission power relative to a reference signal transmission power.

9. The network node of claim 8, wherein the determined gain is based at least in part on the PDSCH transmission power control being disabled.

10. The network node of claim 1, wherein the PDSCH transmission power corresponds to a PDSCH energy per resource element, EPRE, value and the reference signal transmission power is a cell specific reference signal, CRS, EPRE value.

11. The network node of claim 1, wherein the indication of the modification of the at least one measurement report trigger is provided by radio resource control signaling, RRC.

12. The network node of claim 1, wherein the at least one measurement report trigger corresponds to a reference signal received quality, RSRQ, measurement report trigger.

13. A method implemented by a network node that is configured to communicate with a wireless device, the method comprising:

determining to transition the wireless device to one of a beamforming mode and non-beam forming mode;

in response to the determination to transition the wireless device, modifying at least one measurement report trigger associated with the wireless device; and transmitting an indication of the modification of the at least one measurement report trigger to the wireless device.

14. The method of claim 13, further comprising estimating a change in a received signal strength indicator, RSSI, at the wireless device, the modification of the at least one measurement report trigger being based at least in part on the estimated change in the RSSI at the wireless device.

15. The method of claim 13, wherein the wireless device is transitioned from a non-beamforming mode to a beamforming mode; and the method further comprising determining a power gain associated with the beamforming mode, the modification of the at least one measurement report trigger being based at least in part on the determined power gain associated with the beamforming mode.

16. The method of claim 15, wherein the determined power gain is based at least in part on at least one of:

a physical downlink shared channel, PDSCH, allocation size to the wireless device;

a beamforming gain per at least one physical resource block, PRB; and a PDSCH transmission power with respect to a reference signal transmission power.

17. The method of claim 15, wherein the determined power gain is based at least in part on a ratio of the PDSCH transmission power relative to a reference signal transmission power.

18. The method of claim 17, wherein the determined gain is based at least in part on the PDSCH transmission power control being disabled.

19. The method of claim 15, wherein the determined power gain is based at least in part on a weighted sum of a ratio of a PDSCH transmission power and a reference signal transmission power per physical resource block.

20. The method of claim 19, wherein the determined power gain is based at least in part on the PDSCH power control being enabled.

21. The method claim 19, further comprising performing time filtering across a plurality of subframes associated with the ratio of the PDSCH transmission power and reference signal transmission power per physical resource block to determine an expected power gain; and the determined power gain associated with the beamforming mode corresponding to the expected power gain.

22. The method of claim 13, wherein the PDSCH transmission power corresponds to a PDSCH energy per resource element, EPRE, value and the reference signal transmission power is a cell specific reference signal, CRS, EPRE value.

23. The method of claim 13, wherein the indication of the modification of the at least one measurement report trigger is provided by radio resource control signaling, RRC.

24. The method of claim 13, wherein the at least one measurement report trigger corresponds to a reference signal received quality, RSRQ, measurement report trigger.

* * * * *